United States Patent
Li et al.

(10) Patent No.: US 12,404,922 B2
(45) Date of Patent: Sep. 2, 2025

(54) POWER SHAFT STRUCTURE OF ELECTRIC DRIVE ASSEMBLY

(71) Applicant: Jing-Jin Electric Technologies Co., Ltd., Beijing (CN)

(72) Inventors: Jianwen Li, Beijing (CN); Ping Yu, Beijing (CN); Xudong Yang, Beijing (CN); Ruikun Wang, Beijing (CN)

(73) Assignee: JING-JIN ELECTRIC TECHNOLOGIES CO., LTD., Beijing (CN)

( * ) Notice: Subject to any disclaimer, the term of this patent is extended or adjusted under 35 U.S.C. 154(b) by 0 days.

(21) Appl. No.: 18/726,364

(22) PCT Filed: May 16, 2022

(86) PCT No.: PCT/CN2022/093020
§ 371 (c)(1),
(2) Date: Jul. 2, 2024

(87) PCT Pub. No.: WO2023/130642
PCT Pub. Date: Jul. 13, 2023

(65) Prior Publication Data
US 2025/0116324 A1  Apr. 10, 2025

(30) Foreign Application Priority Data
Jan. 4, 2022  (CN) .......................... 202210003101.9

(51) Int. Cl.
*F16H 57/00*  (2012.01)
*F16D 1/068*  (2006.01)
(Continued)

(52) U.S. Cl.
CPC ......... *F16H 57/0025* (2013.01); *F16D 1/068* (2013.01); *F16D 1/08* (2013.01);
(Continued)

(58) Field of Classification Search
CPC ......... F16H 2057/02034; F16H 57/021; F16H 57/0025; F16H 57/023; H02K 7/1116
See application file for complete search history.

(56) References Cited

U.S. PATENT DOCUMENTS

| | | | |
|---|---|---|---|
| 4,133,216 A | * | 1/1979 | Gentile ................ F16H 57/022 74/414 |
| 2019/0252943 A1 | | 8/2019 | Wang et al. |
| 2021/0332877 A1 | | 10/2021 | Li et al. |

FOREIGN PATENT DOCUMENTS

| | | |
|---|---|---|
| CN | 101532498 A | 9/2009 |
| CN | 206180768 U | 5/2017 |

(Continued)

OTHER PUBLICATIONS

CN108843788A Machine Translation (Year: 2018).*

(Continued)

*Primary Examiner* — Jake Cook
(74) *Attorney, Agent, or Firm* — ARENTFOX SCHIFF LLP

(57) ABSTRACT

A power shaft structure of an electric drive assembly is disclosed. The power shaft structure comprises a main shaft, a right end of the main shaft is located inside a motor and fixedly connected to a rotor of the motor, and a left end of the main shaft is located inside a reducer and fixedly connected to a driving gear and a parking gear of the reducer. At least one side of the driving gear is provided with an axially extending flange, and at least one side of the parking gear is provided with an axially extending flange. A bushing is provided between an inner hole of one flange at one side of the driving gear and the main shaft as well as between an inner hole of one flange at one side of the parking gear and the main shaft for radial positioning of the driving gear and the parking gear, so that the driving gear, the parking gear, and the main shaft are on the same axis, thereby improving (Continued)

the stability and NVH performance of the electric drive assembly.

18 Claims, 2 Drawing Sheets

(51) Int. Cl.
    *F16D 1/08*         (2006.01)
    *F16D 1/10*         (2006.01)
    *F16H 57/02*       (2012.01)
    *F16H 57/021*     (2012.01)
    *F16H 57/023*     (2012.01)
    *F16H 63/34*      (2006.01)

(52) U.S. Cl.
    CPC .............. *F16D 1/10* (2013.01); *F16H 57/021* (2013.01); *F16H 57/023* (2013.01); *F16H 63/3416* (2013.01); *F16D 2001/103* (2013.01); *F16H 2057/02034* (2013.01); *F16H 2057/02043* (2013.01)

(56) References Cited

FOREIGN PATENT DOCUMENTS

| | | | | |
|---|---|---|---|---|
| CN | 108674179 | A | | 10/2018 |
| CN | 108843788 | A * | 11/2018 | ........... F16H 57/023 |
| CN | 210941347 | U | | 7/2020 |
| CN | 211684621 | U | | 10/2020 |
| CN | 114321334 | A | | 4/2022 |
| DE | 102013209579 | B3 | | 10/2014 |
| GB | 1131377 | A * | 10/1968 | ........... F16H 57/023 |
| IN | 1476/DEL/2004 | | | 1/2008 |
| JP | S50-107857 | U | | 9/1975 |
| JP | S57-028945 | U | | 2/1982 |
| JP | 2005-106219 | A | | 4/2005 |
| JP | 2020-158012 | A | | 10/2020 |
| WO | 2014/187459 | A1 | | 11/2014 |
| WO | 2019/170439 | A1 | | 9/2019 |
| WO | 2023/130642 | A1 | | 7/2023 |

OTHER PUBLICATIONS

International Search Report received for PCT Patent Application No. PCT/CN2022/093020, mailed on Jul. 29, 2022, 4 pages (2 pages of English Translation and 2 pages of Original Document).

Extended European Search Report received for European Patent Application No. 22918101.1, mailed on May 9, 2025, 5 pages.

Jouleast et al., "Fundamentals of Mechanical Design", Machine Industry Press, Jan. 31, 2021, 4 pages (1 page of English Translation and 3 pages of Original Document).

Office Action received for Chinese Patent Application No. 202210003101.9, mailed on Apr. 30, 2025, 16 pages (8 pages of English Translation and 8 pages of Original Document).

Office Action received for Japanese Patent Application No. 2024-540806, mailed on Jun. 3, 2025, 7 pages (4 pages of English Translation and 3 pages of Original Document).

* cited by examiner

POWER SHAFT STRUCTURE OF ELECTRIC DRIVE ASSEMBLY

CROSS REFERENCING OF RELATED APPLICATIONS

This application is a National Phase of PCT/CN2022/093020 filed on May 16, 2022, which claims priority to the Chinese patent application No. 202210003101.9 filed with the Chinese Patent Office on Jan. 4, 2022 the contents of each of which are hereby incorporated by reference in their entireties.

TECHNICAL FIELD

The present disclosure belongs to the technical field of motor transmission structure, and particularly relates to a power shaft structure of an electric drive assembly.

BACKGROUND

At present, in order to facilitate the production of motor and reducer of the electric vehicle, the motor shaft and the input shaft of the reducer are usually independently designed, and then connected together through splines or couplings so as to achieve torque transmission between the motor and the reducer. However, this transmission structure is not only complicated, but also increases the axial size between the reducer and the motor, which is not conducive to the overall layout of the vehicle.

In addition, due to the poor precision of machining and manufacturing of the parking gear, when the parking gear and the input shaft of the reducer are assembled with a clearance fit, it is difficult to ensure the concentricity between them, which leads to poor dynamic balance and stability of the input shaft of the reducer during rotation, and results in poor NVH (Noise, Vibration, Harshness) performance of the entire electric drive assembly. If the concentricity when the parking gear and the input shaft of the reducer are assembled is improved by improving the machining precision of the parking gear, the manufacturing cost of the parking gear will be greatly increased.

SUMMARY

With respect to the above problems, the present disclosure discloses a power shaft structure of an electric drive assembly to overcome or at least partially solve the above problems.

To achieve the above object, the present disclosure adopts the following technical solutions.

The present disclosure provides a power shaft structure of an electric drive assembly, the power shaft structure comprises a main shaft, a right end of the main shaft is located inside a motor and fixedly connected to a rotor of the motor, and a left end of the main shaft is located inside a reducer and fixedly connected to a driving gear and a parking gear of the reducer;
  at least one side of the driving gear is provided with an axially extending flange, and at least one side of the parking gear is provided with an axially extending flange;
  wherein a bushing is provided between an inner hole of the flange at one side of the driving gear and the main shaft as well as between an inner hole of the flange at one side of the parking gear and the main shaft for radial positioning of the driving gear and the parking gear.

Further, the driving gear is provided between the parking gear and the motor, the left side of the driving gear is provided with a first flange that extends axially, the right side of the driving gear is provided with a second flange that extends axially, and the right side of the parking gear is provided with a third flange that extends axially;
  an inner hole of the second flange matches up with a diameter of the main shaft for radially positioning, and the bushing is provided between an inner hole of the first flange and the main shaft and extends into an inner hole of the third flange.

Further, a transition fit or an interference fit is formed between the inner hole of the second flange and the main shaft;
  a transition fit or an interference fit is formed between the inner hole of the first flange, the bushing and the main shaft, as well as between the inner hole of the third flange and the bushing.

Further, a left end bearing is provided between the housing of the reducer and the main shaft, a right end bearing is provided between the housing of the motor and the main shaft, a intermediate housing is provided between the motor and the reducer, and a middle bearing is provided between the intermediate housing and the main shaft.

Further, the second flange presses tightly and fixes a left end face of an inner ring of the middle bearing; or
  a first shaft sleeve is provided on the main shaft on a left side of the middle bearing, and is used to press tightly and fix the left end face of the inner ring of the middle bearing.

Further, the parking gear presses tightly and fixes a right end face of an inner ring of the left end bearing; or
  a second shaft sleeve is provided on the main shaft on a right side of the left end bearing, and is used to press tightly and fix the right end face of the inner ring of the left end bearing.

Further, a pressing ring is provided on a right end face of an outer ring of the left end bearing on the housing of the reducer, and the pressing ring presses tightly and fixes the outer ring of the left end bearing.

Further, a locking nut is provided on the main shaft at a left side of the left end bearing, and is used to press tightly and fix the left end face of the inner ring of the left end bearing.

Further, the main shaft is provided with a first external spline and a second external spline, the parking gear is provided with a first internal spline engaging with the first external spline, and the driving gear is provided with a second internal spline engaging with the second external spline.

Further, the parking gear is connected to the main shaft using a flat key, and the driving gear is connected to the main shaft using a flat key, respectively; or
  the inner hole of the parking gear and the inner hole of the driving gear are both smooth holes, and are respectively connected to the main shaft with an interference fit or by welding.

The advantages and beneficial effects of the present disclosure are as follows.

In the power shaft structure of the present disclosure, at least one side of each of the driving gear and the parking gear is provided with an axially extending flange, and then an bushing is provided between the inner hole of the flange at one side of the driving gear and the main shaft, as well as between the inner hole of the flange at one side of the parking gear and the main shaft, so that the radial positioning of the driving gear and the parking gear is achieved, and the driving gear, the parking gear and the main shaft are on the same axis, thereby ensuring the concentricity between the driving gear, the parking gear and the main shaft, and improving the stability and NVH performance of the electric drive assembly.

BRIEF DESCRIPTION OF DRAWINGS

By reading the detailed description of the preferred embodiments below, various other advantages and benefits will become clear to a person of ordinary skill in the art. The accompanying drawings are only used for the purpose of illustrating the preferred embodiments, and should not be considered as a limitation to the present disclosure. Moreover, throughout the drawings, the same reference numerals are used to denote the same components. In the drawings.

Figure 1:
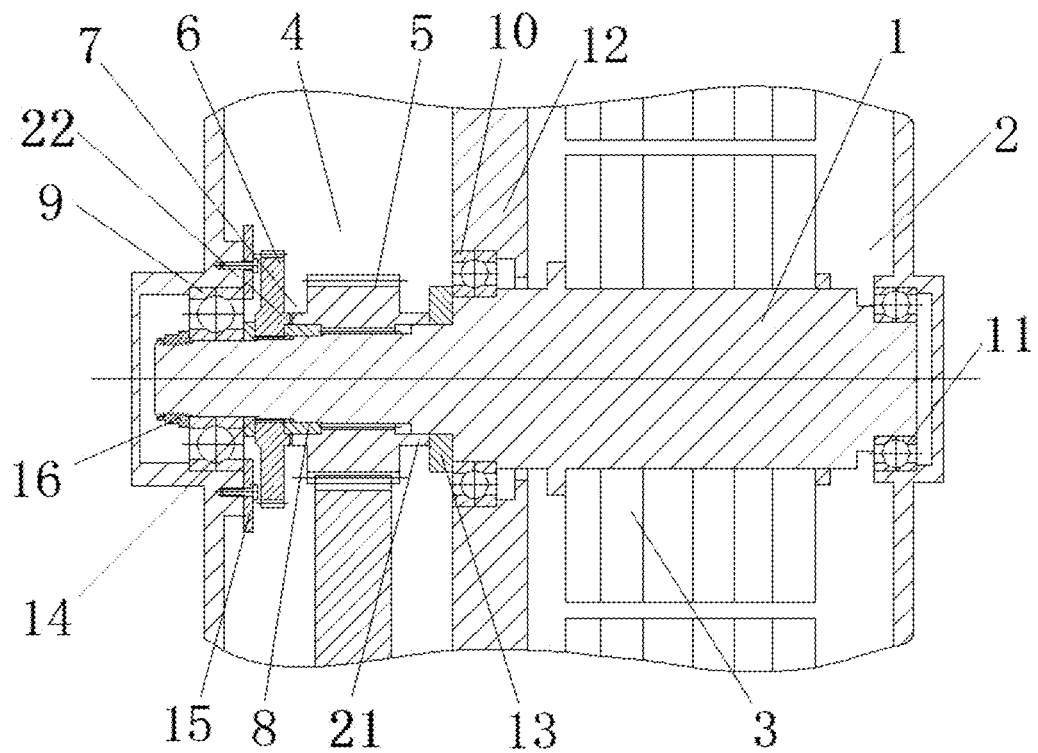
FIG. 1 is an axial cross-sectional view of a power shaft structure of an electric drive assembly in a first embodiment.

In the drawings: 1, main shaft; 2, motor; 3, rotor; 4, reducer; 5, driving gear; 6, parking gear; 7, first flange; 8, bushing; 9, left end bearing; 10, middle bearing; 11, right end bearing; 12, intermediate housing; 13, first shaft sleeve; 14, second shaft sleeve; 15, pressing ring; 16, locking nut; 17, first external spline; 18, second external spline; 19, first internal spline; 20, second internal spline; 21, second flange; 22, third flange.

DETAILED DESCRIPTION

In order to make the object, technical solutions, and advantages of the present disclosure clearer, the present disclosure will be described clearly and completely in conjunction with the specific embodiments and corresponding drawings. Obviously, the embodiments described are only part of rather than all of the embodiments of the present disclosure. Based on the embodiments in the present disclosure, all other embodiments obtained by those of ordinary skill in the art without paying creative work shall fall within the protection scope of the present disclosure.

The technical solutions provided by the embodiments of the present disclosure will be described in detail below in conjunction with the accompanying drawings.

First Embodiment

This embodiment provides a power shaft structure of an electric drive assembly. As shown in FIG. 1, the power shaft structure comprises a main shaft 1. The right end of the main shaft 1 is located inside a motor 2, and is fixedly connected to a rotor 3 of the motor 2 as the motor shaft, that is, the rotor 3 is sleeved on the right end of the main shaft 1. The left end of the main shaft 1 is located inside a reducer 4, and is fixedly connected to a driving gear 5 and a parking gear 6 of the reducer 4 as the input shaft of the reducer 4, that is, the driving gear 5 and the parking gear 6 are sleeved on the left end of the main shaft 1. The parking gear is used to achieve the parking function of the vehicle, and the driving gear is used to drive the rotation of other gears in the reducer to achieve power output.

In this embodiment, the motor shaft and the input shaft of the reducer are designed as an integral main shaft, and two ends of the main shaft extend into the motor and the reducer respectively to serve as both the motor shaft and the input shaft of the reducer. In this way, it not only has the advantages of simple structure and convenient installation, but also reduces the overall axial size of the electric drive assembly, which is conducive to the overall layout of the vehicle, and is lightweight.

In addition, at least one side of the driving gear is provided with an axially extending flange, and at least one side of the parking gear is provided with an axially extending flange; a bushing is provided between an inner hole of one flange at one side of the driving gear and the main shaft as well as between an inner hole of one flange at one side of the parking gear and the main shaft for radial positioning of the driving gear and the parking gear, so that the driving gear, the parking gear and the main shaft are on the same axis, thereby improving the dynamic balance of the electric drive assembly and reducing vibration and noise.

In this power shaft structure, at least one side of the driving gear is provided with the axially extending flange, at least one side of the parking gear is provided with the axially extending flange, and then the bushing is provided between the inner hole of the flange at one side of the driving gear, the inner hole of the flange at one side of the parking gear and the main shaft, so that the radial positioning of the driving gear and the parking gear is achieved, thereby ensuring the concentricity between the driving gear, the parking gear and the main shaft, and improving the stability and NVH performance of the electric drive assembly.

Figure 2:
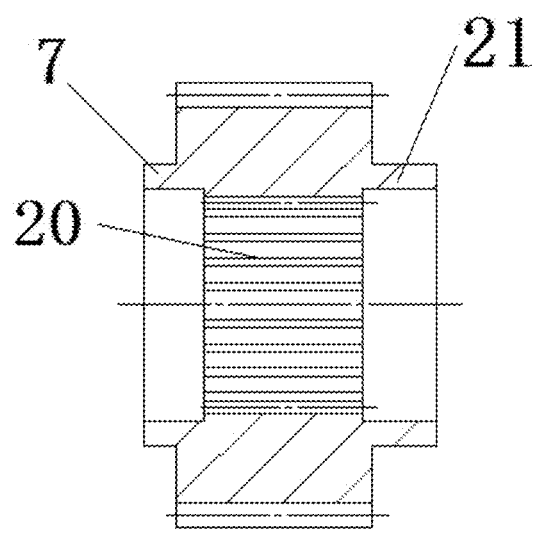
FIG. 2 is an axial cross-sectional view of a driving gear in the first embodiment.
Figure 3:
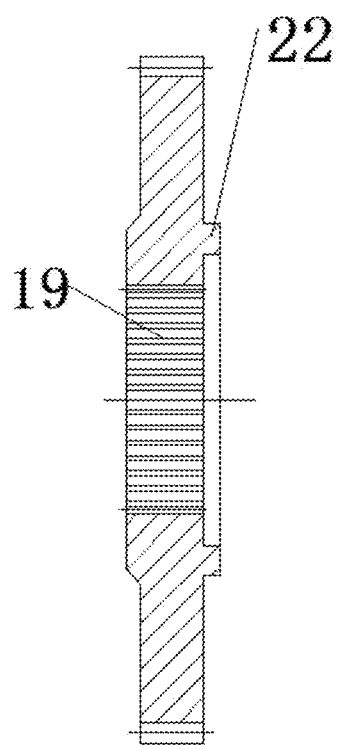
FIG. 3 is an axial cross-sectional view of a parking gear in the first embodiment.

In this embodiment, as shown in FIGS. 1 to 3, the driving gear 5 is provided between the parking gear 6 and the motor 2. A first flange 7 that axially extends is provided at the left side of the driving gear 5, a second flange 21 that axially extends is provided at the right side of the driving gear 5, and a third flange 22 that axially extends is provided at the right side of the parking gear 6. A bushing 8 is provided between the second flange 21 and the main shaft 1 and extends into the inner hole of the third flange 22, so that the third flange 22 is sleeved on the bushing 8, and the second flange 21 matches up with a diameter of the main shaft 1 for radially positioning.

In addition, the bushing 8 is provided between the first flange 7 and the main shaft 1, and extends into the inner hole of the third flange 22, that is, one end of the bushing 8 is provided between the inner hole of the first flange 7 and the main shaft 1, and the third flange 22 is sleeved on the other end of the bushing 8. By providing the bushing 8, it is possible to make the driving gear 5, the parking gear 6, and the main shaft 1 concentric. At this point, there is only circumferential torque, and not a radial support force, between the main shaft and the parking gear.

Specifically, the second flange on the driving gear matches up with the diameter of the main shaft to achieve radial positioning, while the first flange achieves radial positioning through the bushing, thereby achieving coaxial alignment between the driving gear and the main shaft. Due to the high machining accuracy of the driving gear, the concentricity between the driving gear and the main shaft is higher when the driving gear is assembled on the main shaft. Therefore, the driving gear and the parking gear share the same bushing, first the parking gear and the driving gear is kept coaxial, and then the parking gear and the main shaft are made coaxial through the driving gear. This structure can effectively improve the concentricity between the parking gear and the main shaft, thereby ensuring that there is a higher concentricity between the driving gear, the parking gear and the main shaft.

Further, a transition fit or an interference fit is formed between the inner hole of the second flange and the main shaft to ensure a firm connection between the second flange and the main shaft.

A transition fit or an interference fit is formed between the inner hole of the first flange, the bushing and the main shaft, as well as between the inner hole of the third flange and the bushing to achieve relative fixation between the driving gear, the parking gear, and the main shaft.

In this embodiment, as shown in FIG. 1, the left end, middle, and right end of the main shaft 1 are supported and positioned by a left end bearing 9, a middle bearing 10, and a right end bearing 11, respectively.

Specifically, the left end bearing 9 is provided between a housing of the reducer 4 and the main shaft 1, the right end bearing 11 is provided between a housing of the motor 2 and the main shaft, an intermediate housing 12 is provided between the motor 2 and the reducer 4, and a middle bearing 10 is provided between the intermediate housing 12 and the main shaft 1. In this embodiment, by providing the left end bearing 9, the middle bearing 10, and the right end bearing 11, the rotation of the main shaft 1 relative to the housing of the reducer 4, the housing of the motor 2, and the intermediate housing 12 is achieved.

In this embodiment, as shown in FIG. 1, a first shaft sleeve 13 is provided on the main shaft 1. The first shaft sleeve 13 is located on the left side of the middle bearing 10, and is used to press tightly and fix the left end face of the inner ring of the middle bearing 10. Specifically, the first shaft sleeve 13 is provided on the main shaft 1 with an interference fit, so that the first shaft sleeve 13 is fixed relative to the main shaft 1. Alternatively, the second flange 21 directly abuts and presses against the first shaft sleeve 13, so that the first shaft sleeve 13 is fixed relative to the main shaft 1. Then, since the first shaft sleeve 13 presses tightly and fixes the left end face of the inner ring of the middle bearing 10, the inner ring of the middle bearing 10 is fixed relative to the main shaft 1. The outer ring of the first shaft sleeve 13 is fixed in the bearing groove on the intermediate housing 12, thereby enabling the main shaft 1 to rotate relative to the intermediate housing 12.

In this embodiment, as shown in FIG. 1, a second shaft sleeve 14 is provided on the main shaft 1 at the right side of the left end bearing 9. The second shaft sleeve 14 is located on the right side of the left end bearing 9 and is used to press tightly and fix the right end face of the inner ring of the left end bearing 9. At the same time, a locking nut 16 is provided on the main shaft 1 at the left side of the left end bearing 9, and is used to press tightly and fix the left end face of the inner ring of the left end bearing 9. By clamping the inner ring of the left end bearing 9 using the locking nut 16 and the second shaft sleeve 14, the relative fixation between the inner ring of the left end bearing 9 and the main shaft 1 is achieved.

Further, as shown in FIG. 1, a pressing ring 15 is provided on the housing of reducer 4 and at the right side of the left end bearing 9. The pressing ring 15 presses tightly and fixes the outer ring of the left end bearing 9, thereby achieving the relative fixation between the outer ring of the left end bearing 9 and the housing of reducer 4. Specifically, the pressing ring 15 is fixed to the housing of the reducer 4 by screws or bolts.

Figure 4:
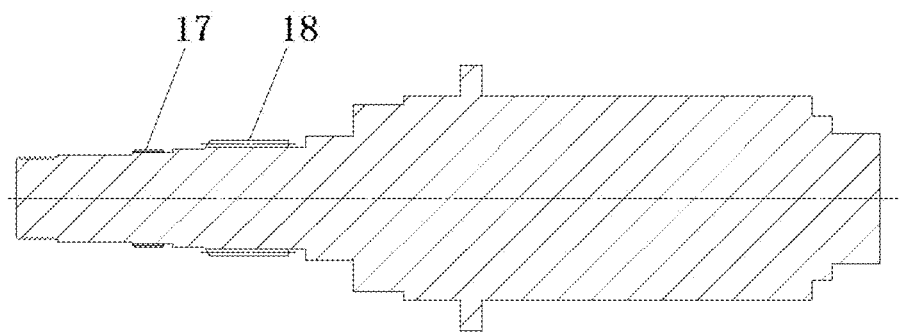
FIG. 4 is an axial cross-sectional view of a main shaft in the first embodiment.

In this embodiment, as shown in FIGS. 2 to 4, the main shaft 1 is provided with a first external spline 17 and a second external spline 18, the parking gear 6 is provided with a first internal spline 19 engaging with the first external spline 17, and the driving gear 5 is provided with a second internal spline 20 engaging with the second external spline 18. In this embodiment, the first external spline 17 engages with the first internal spline 19 to achieve the transmission connection between the main shaft 1 and the parking gear 6; the second outer spline 18 engages with the second inner spline 20 to achieve the transmission connection between the main shaft 1 and the driving gear 5.

Second Embodiment

This embodiment differs from the first embodiment in that the bushing adopts a split design. That is, a first bushing is provided between the inner hole of the first flange and the main shaft, and the coaxial alignment between the driving gear and the main shaft is achieved through the first bushing; a second bushing is provided between the inner hole of the third flange and the main shaft, and the coaxial alignment between the parking gear and the main shaft is achieved through the second bushing, thereby achieving the coaxial alignment between the driving gear, the parking gear, and the main shaft. The split design can effectively reduce the assembly difficulty of the parking gear and the driving gear on the main shaft.

Third Embodiment

This embodiment differs from the first embodiment in that the first shaft sleeve is omitted. That is, the second flange directly presses tightly and fixes the left end face of the inner ring of the middle bearing, thereby achieving relative fixation between the inner ring of the middle bearing and the main shaft, and making the structure simpler.

Fourth Embodiment

This embodiment differs from the first embodiment in that the second shaft sleeve is omitted. That is, the parking gear directly presses tightly and fixes the right end face of the inner ring of the left end bearing. The inner ring of the left end bearing is clamped and fixed by the parking gear and the locking nut, thereby achieving the relative fixation between the inner end face of the left end bearing and the main shaft, and making the structure simpler.

Fifth Embodiment

This embodiment differs from the first embodiment in that the spline connection is replaced by a flat key connection between the parking gear and the main shaft as well as between the driving gear and the main shaft. Alternatively, the inner hole of the parking gear and the inner hole of the driving gear are both smooth holes, and are respectively connected to the main shaft with an interference fit or by welding.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of explaining the present disclosure, and the protection scope of the present disclosure should be subject to the protection scope of the claims.

What is claimed is:

1. A power shaft structure of an electric drive assembly, the power shaft structure comprising:
   a main shaft, a right end of the main shaft located inside a motor and fixedly connected to a rotor of the motor, and a left end of the main shaft located inside a reducer and fixedly connected to a driving gear and a parking gear of the reducer,
   wherein the driving gear is provided between the parking gear and the motor, the left side of the driving gear is provided with a first flange, the right side of the driving gear is provided with a second flange, and the right side of the parking gear is provided with a third flange that extends axially,
   wherein a bushing is disposed between an inner hole of the first flange and the main shaft and also between an inner hole of the second flange and the main shaft for radial positioning of the driving gear and the parking gear, and
   wherein the inner hole of the second flange matches up with a diameter of the main shaft for radially positioning, and the bushing is disposed between the inner hole of the first flange and the main shaft and extends into an inner hole of the third flange.

2. The power shaft structure according to claim 1, further comprising:
   a transition fit or an interference fit between the inner hole of the second flange and the main shaft; and
   a transition fit or an interference fit between the inner hole of the first flange, the bushing and the main shaft, and also between the inner hole of the third flange and the bushing.

3. The power shaft structure according to claim 1, further comprising a left end bearing between a housing of the reducer and the main shaft, a right end bearing between a housing of the motor and the main shaft, an intermediate housing between the motor and the reducer, and a middle bearing between the intermediate housing and the main shaft.

4. The power shaft structure according to claim 3, wherein the second flange presses and fixes a left end face of an inner ring of a middle bearing; or
   a first shaft sleeve is disposed on the main shaft on a left side of the middle bearing and is configured to press and fix the left end face of the inner ring of the middle bearing.

5. The power shaft structure according to claim 3, wherein the parking gear presses and fixes a right end face of an inner ring of the left end bearing; or
   a second shaft sleeve is disposed on the main shaft on a right side of the left end bearing and is configured to press and fix the right end face of the inner ring of the left end bearing.

6. The power shaft structure according to claim 3, further comprising a pressing ring on a right end face of an outer ring of the left end bearing on the housing of the reducer, the pressing ring being configured to press and fix the outer ring of the left end bearing.

7. The power shaft structure according to claim 3, further comprising a locking nut on the main shaft at a left side of the left end bearing, the locking nut being configured to press and fix the left end face of the inner ring of the left end bearing.

8. The power shaft structure according to claim 1, wherein the main shaft is provided with a first external spline and a second external spline, the parking gear is provided with a first internal spline engaging with the first external spline, and the driving gear is provided with a second internal spline engaging with the second external spline.

9. The power shaft structure according to claim 1, wherein the parking gear is connected to the main shaft using a first flat key, and the driving gear is connected to the main shaft using a second flat key; or
   an inner hole of the parking gear and an inner hole of the driving gear are both smooth holes, and are respectively connected to the main shaft with an interference fit or by welding.

10. The power shaft structure according claim 1, wherein the main shaft comprises a first external spline and a second external spline, the parking gear comprises a first internal spline engaging with the first external spline, and the driving gear comprises a second internal spline engaging with the second external spline.

11. The power shaft structure according claim 2, wherein the main shaft comprises a first external spline and a second external spline, the parking gear comprises a first internal spline engaging with the first external spline, and the driving gear comprises a second internal spline engaging with the second external spline.

12. The power shaft structure according claim 3, wherein the main shaft comprises a first external spline and a second external spline, the parking gear comprises a first internal spline engaging with the first external spline, and the driving gear comprises a second internal spline engaging with the second external spline.

13. The power shaft structure according claim 4, wherein the main shaft comprises a first external spline and a second external spline, the parking gear comprises a first internal spline engaging with the first external spline, and the driving gear comprises a second internal spline engaging with the second external spline.

14. The power shaft structure according claim 5, wherein the main shaft comprises a first external spline and a second external spline, the parking gear comprises a first internal spline engaging with the first external spline, and the driving gear comprises a second internal spline engaging with the second external spline.

15. The power shaft structure according to claim 2, wherein the parking gear is connected to the main shaft using a first flat key, and the driving gear is connected to the main shaft using a second flat key; or
   an inner hole of the parking gear and an inner hole of the driving gear are both smooth holes, and are respectively connected to the main shaft with an interference fit or by welding.

16. The power shaft structure according to claim 3, wherein the parking gear is connected to the main shaft using a first flat key, and the driving gear is connected to the main shaft using a second flat key; or
   an inner hole of the parking gear and an inner hole of the driving gear are both smooth holes, and are respectively connected to the main shaft with an interference fit or by welding.

17. The power shaft structure according to claim 4, wherein the parking gear is connected to the main shaft using a first flat key, and the driving gear is connected to the main shaft using a second flat key; or an inner hole of the parking gear and an inner hole of the driving gear are both smooth holes, and are respectively connected to the main shaft with an interference fit or by welding.

18. The power shaft structure according to claim 5, wherein the parking gear is connected to the main shaft using a first flat key, and the driving gear is connected to the main shaft using a second flat key; or an inner hole of the parking gear and an inner hole of the driving gear are both smooth holes, and are respectively connected to the main shaft with an interference fit or by welding.

\* \* \* \* \*